United States Patent [19]

Tatsumi et al.

[11] Patent Number: 4,620,199

[45] Date of Patent: Oct. 28, 1986

[54] THERMAL TRANSFER COLOR PRINTER

[75] Inventors: Hisao Tatsumi; Haruhiko Kayata, both of Nagoya; Fumio Watanabe, Yokohama, all of Japan

[73] Assignee: Kabuskiki Kaisha Toshiba, Kawasaki, Japan

[21] Appl. No.: 650,078

[22] Filed: Sep. 13, 1984

[30] Foreign Application Priority Data

Sep. 16, 1983 [JP] Japan .......................... 58-144163[U]
Sep. 21, 1983 [JP] Japan .......................... 58-147009[U]

[51] Int. Cl.[4] ............................................. G01D 15/10

[52] U.S. Cl. .................... 346/76 PH; 400/120/240.3; 346/106

[58] Field of Search .................. 400/240, 240.3, 240.4, 400/219–219.4, 207–208.1, 244, 120; 250/317.1, 318, 319, 202, 548; 346/76 PH, 76 R, 105, 106; 219/216 PH

[56] References Cited

U.S. PATENT DOCUMENTS 4,468,139 8/1984 Hattori .......................... 346/76 PH

FOREIGN PATENT DOCUMENTS 49-26245 7/1974 Japan ............................ 346/76 PH
0154193 12/1980 Japan ............................ 400/240.3
57-18278 1/1982 Japan ............................ 346/76 PH
57-21471 5/1982 Japan ............................ 346/76 PH
0193184 11/1983 Japan ............................ 400/120

*Primary Examiner*—Art Evans
*Attorney, Agent, or Firm*—Schwartz, Jeffery, Schwaab, Mack, Blumenthal & Evans

[57] ABSTRACT

A thermal transfer color printer according to the present invention thermal inkribbon having heat-fusible color materials in a plurality of colors divided in the feed direction, a thermal head which moves relative to a print paper in order to cause the selective thermal transfer of the color material on a thermal inkribbon onto the print paper, and a color sensor for detecting the types of color materials on the thermal inkribbon. The distance in the feed direction of the color material portions of the thermal inkribbon is set at one divided by an integral portion of the standard print width of the print paper, while the distance between the color sensor and the thermal head is set the same as the distance in the feed direction of the color materials portion of the thermal inkribbon. The thermal transfer color printer further comprises a ribbon feed mechanism which cause the feed action of the thermal inkribbon, a head movement mechanism which causes movement of the thermal head to the print position and the standby position, a carriage movement mechanism which causes the carriage on which the thermal head and the color sensor are mounted, to move relative to the print paper, and a control device for cooperatively controls the ribbon feed mechanism, the head movement mechanism, and the carriage movement mechanism based on the print data differentiated by the color material.

10 Claims, 18 Drawing Figures

THERMAL TRANSFER COLOR PRINTER

BACKGROUND OF THE INVENTION

1. Field of the Invention

The present invention relates to a thermal transfer color printer which selectively transfers color-record forming materials (color materials) from a thermal ink ribbon, which has a plurality of color materials divided in the feed direction, to a record medium by applying thermal energy to localized areas on the thermal ink ribbon according to print data differentiated by the color material or identified with different colors and, more particularly, to a thermal transfer color printer which can reduce to a minimum the amount of thermal ink ribbon used.

2. Description of the Prior Art

Generally, a thermal transfer color printer is provided with a thermal head on a carriage which moves relative to a record medium, such as a print paper, and a thermal ink ribbon on which are spread a plurality of heat fusible color materials divided in the feed direction of the ink ribbon (the long direction). In order to cause the selective heat transfer of the color material onto the printing paper according to print data differentiated by the color material, the carriage is caused to move, while at the same time, the thermal ribbon is fed forward. A color sensor for detecting the position of the color material on the thermal ink ribbon is provided on the carriage. The feeding action of the thermal ink ribbon is carried out such that a leading section of the color material scheduled for printing is positioned on the thermal head, according to the positional data of the color material detected by the color sensor. There are two positioning methods commonly used for the color sensor of a conventional color printer. In one of these methods the color sensor is positioned at the ink ribbon upstream side of the thermal head. Then, after the detection of the tip of the color material scheduled to be printed by the color sensor, the tip position of each color material is moved from the sensor section to the thermal head with the rotation of an ink ribbon reel. However, in this method, the length of the ink ribbon wound by one rotation of the reel is determined by the diameter of the roll of ink ribbon on the winding side. This diameter gradually becomes larger the more the ink ribbon is used, so that there is usually a variation of two to three times from the time when the use of a new ribbon is started until the ribbon is almost finished. Accordingly, the length of the ink ribbon which is wound up also varies to the same extent. From the fact that this variation takes place, it is necessary to move the ink ribbon an extra distance so as to always come the tip position of each color material to the thermal head position, thereby wasting the amount of ribbon equivalent to this extra distance. In addition, in other printers the color sensor is positioned directly behind the thermal head, but in this case also, in the same way as the example of a conventional unit which has just been explained, an amount of the thermal ink ribbon relative to the distance between the color sensor and the thermal head is wasted.

In the thermal transfer method, the ink ribbon is heated by the thermal head and the ink is physically transferred from the localized areas on the ink ribbon, so that the ribbon cannot be reused. Accordingly, the ink ribbon is discarded after only one use, so that the cost of ink ribbons is high. In the thermal transfer method, therefore, the efficiency of the use of the thermal ink ribbon is extremely important in the finished product.

Also, in the thermal transfer color printer a slightly longer length of color material than one line of print length on the printing paper is separately coated in a plurality of successive colors, so that, even for a small amount of printing, more than one line of print length of ink ribbon uses in several parts of color. Therefore, the utilization efficiency of the ink ribbon is remarkably worsened, and the increase in running costs becomes a major problem.

In prior art thermal transfer color printers, the width of each color material section on the thermal ink ribbon is standard print width with a slight excess added. That is, it is set at the dimension of the standard width dimension of the print paper. As a result, one line of print is obtained by one color material portion. However, in actual practice, printed lines in which the printing carried out in one part only are the most prevalant, and this is particularly evident in color print. When such a print line is printed with the abovementioned prior art thermal transfer color printer, in spite of a large unprinted section being present on each printed line, in each print of line the amount of thermal ink ribbon relative to the standard print width is used. As a result, the thermal ink ribbon is not used effectively. Because of this, with the conventional configuration, there is the drawback that the amount of thermal ink ribbon used increases excessively, and this kind of drawback becomes even more evident, when multicolored portions are present on each printed line.

In prior art color printers, for each completion of one line of print action based on one line of print data, the initial search of the beginning of the color materials is carried out, in other words, the forefront of the prescribed color material is positioned in the heat generating portion of the thermal head. However, in the case where, when the power is cut, the user touches the thermal ink ribbon or its bobbin, and the position of that thermal ink ribbon deviates from the initial position. Therefore, when the print action is started in that position deviation status, there is the worry that a print mistake, print color error, or status where control is impossible, will be brought about. For this reason, conventionally, each time the power is applied, beginning-portion search is carried out.

Here, in the case where the color materials of the thermal ink ribbon are arranged in the order—yellow, magenta, cyan, for example, the print of a magenta color material only occurs on certain print lines, and on the next print line, for example, a cyan color material only is printed. When this happens, at the point in time when the printing of the magenta color material is completed, even though it is possible to print the cyan which follows, after the completion of the printing action of the magenta color material, the unused color materials in one color portion of yellow, magenta, and cyan is fed by the execution of the beginning-portion search. Therefore, there is the drawback which that part of the thermal ink ribbon is wasted, and because of this the problem of high running costs is incurred. In addition, when there is a deviation in the position of the thermal ink ribbon, and also in the case where the beginning-portion is searched when the power is applied, the spread portion of the unused color material is fed in the three colors of yellow, magenta, and cyan. This causes the waste of the thermal ink ribbon. In addition to this, because at the time of beginning-portion search, a thermal ink ribbon of three color parts or one line part must be fed, a comparatively long time is used for that feed action, and there is the problem that the print speed of the whole system becomes slow.

Furthermore, in prior art thermal ink ribbons, at the boundary section of the color materials, the adjacent color materials may be piled up and spread over, and the color sensor misdetects the color materials in that boundary section, and there is the drawback that the reliability of the position detection of the ink ribbon is reduced.

In prior art color printers, the use of a color cassette in which a thermal ink ribbon having a plurality of color materials is stored is usually used, and in the case where printing is done with a single color, a program in a host computer which controls the printer is necessary for use with a single color. Accordingly, when a single color cassette case, in which a thermal ink ribbon for single color is stored, is installed, there is the worry that, because the printer itself cannot distinguish a discrepancy in the color cassette, a print error could be produced, and printing is carried out as color printing.

Also, in order to prevent this from happening, it is necessary to go to the trouble of fully revising the program of the host computer.

SUMMARY OF THE INVENTION

It is therefore an object of the present invention to provide a thermal transfer color printer which is capable of suppressing the amount of thermal color ink ribbon used to the minimum.

A further object of the present invention is to provide a thermal transfer color printer which is capable of reducing the amount of thermal ink ribbon used.

A still further object of the present invention is to provide a thermal transfer color printer which is capable of reducing the running cost.

A still further object of the present invention is to provide a thermal transfer color printer which is capable of increasing the overall printing speed.

A still further object of the present invention is to provide a thermal transfer color printer which is capable of precisely determining the position of the thermal color ink ribbon.

A still further object of the present invention is to provide a thermal transfer color printer which is capable of accurately detecting the positions of each of a plurality of color materials which are arranged in a divided manner in the longitudinal direction of a thermal ink ribbon.

A still further object of the present invention is to provide a thermal transfer color printer which is capable of improving the accuracy of detecting the positions of the color materials of a thermal color ink ribbon.

A still further object of the present invention is to provide a thermal transfer color printer which is capable of carrying out the detection of a single color by a color sensor without having a detection resolution of a single color other than three basic colors.

Briefly described, these and other objects of the present invention are accomplished by the provision of an improved thermal transfer color printer which comprises a thermal ink ribbon having heat-fusible color materials in a plurality of colors divided in the feed direction, a thermal head which moves relative to a print paper in order to cause the selective thermal transfer of the color material on a thermal ink ribbon onto the print paper, and a color sensor for detecting the types of color materials on the thermal ink ribbon. The distance in the feed direction of the color material sections of the thermal ink ribbon is set at the standard print widths of the print papers, while the distance between the color sensor and the thermal head is set the same as the distance in the feed direction of the color materials portion of the thermal ink ribbon. The thermal transfer color printer further comprises a ribbon feed mechanism which cause the feed action of the thermal ink ribbon, a head movement mechanism which causes movement of the thermal head to the print position and the standby position, a carriage movement mechanism which causes the carriage, on which the thermal ink head and the color sensor are mounted, to move relative to the print paper, and a control device for cooperatively controlling the ribbon feed mechanism, the head movement mechanism, and the carriage movement mechanism based on the print data differentiated by the color material. The standard print widths are defined by maximum print widths of standard print papers of the printers. The maximum distances which the thermal heads can move are determined by the maximum print widths.

BRIEF DESCRIPTION OF THE DRAWINGS

These and other objects, features and advantages of the present invention will be more apparent from the following description of a preferred embodiment, taken in conjunction with the accompanying drawings in which.

DESCRIPTION OF THE PREFERRED EMBODIMENTS

Figure 1:
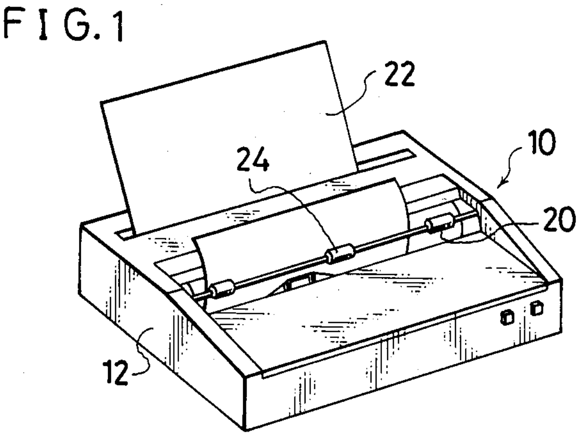
FIG. 1 is a perspective view of a thermal transfer color printer embodying the present invention.
Figure 3:
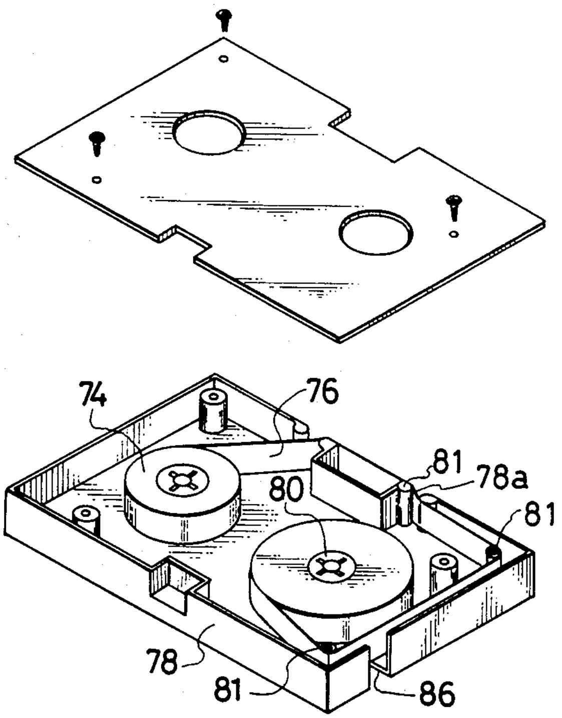
FIG. 3 is a disassembled perspective view of the thermal ink ribbon cassette shown in FIG. 2.
Figure 2:
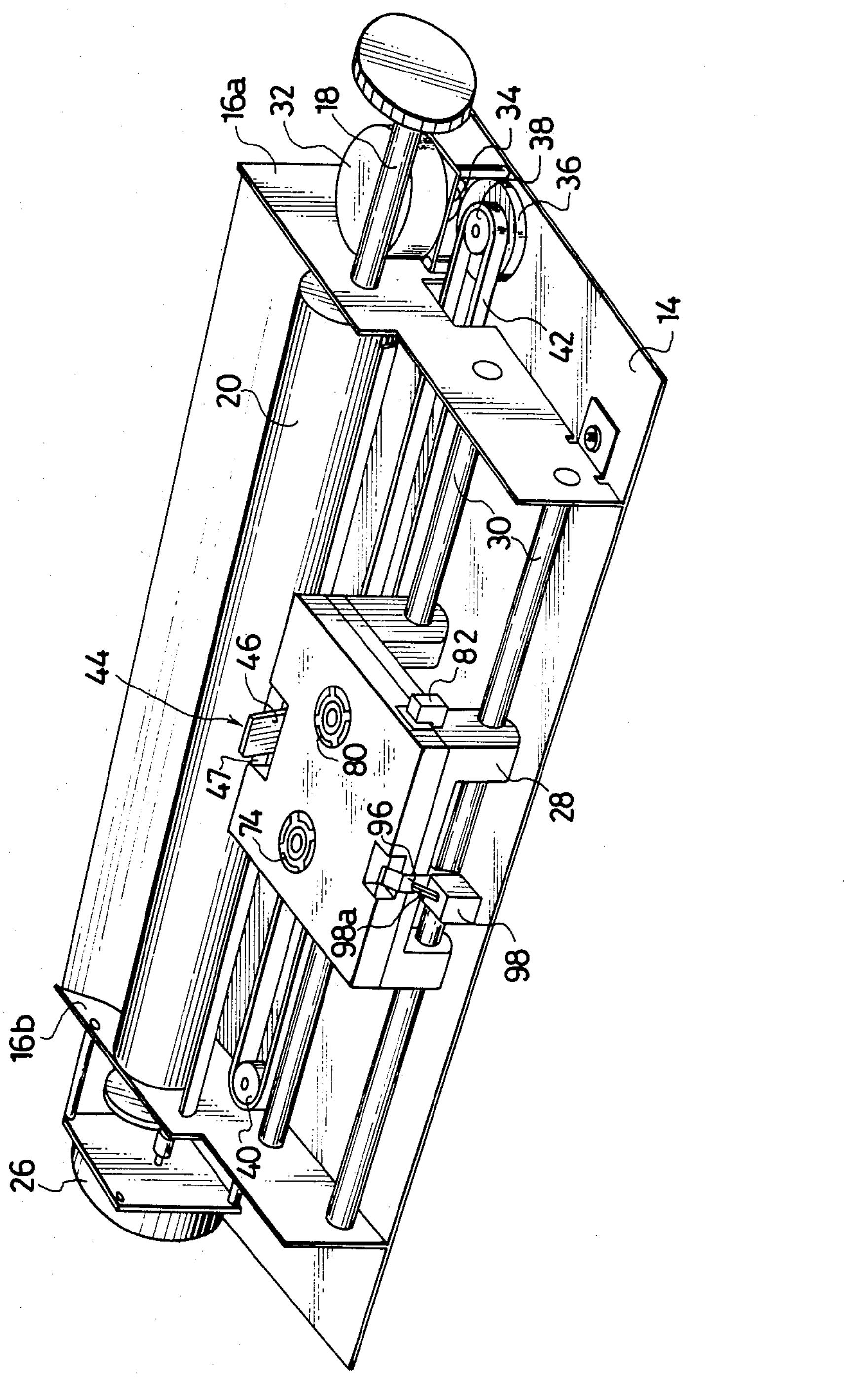
FIG. 2 is a perspective view of the principal mechanism of the thermal transfer color printer embodying the present invention.
Figure 4:
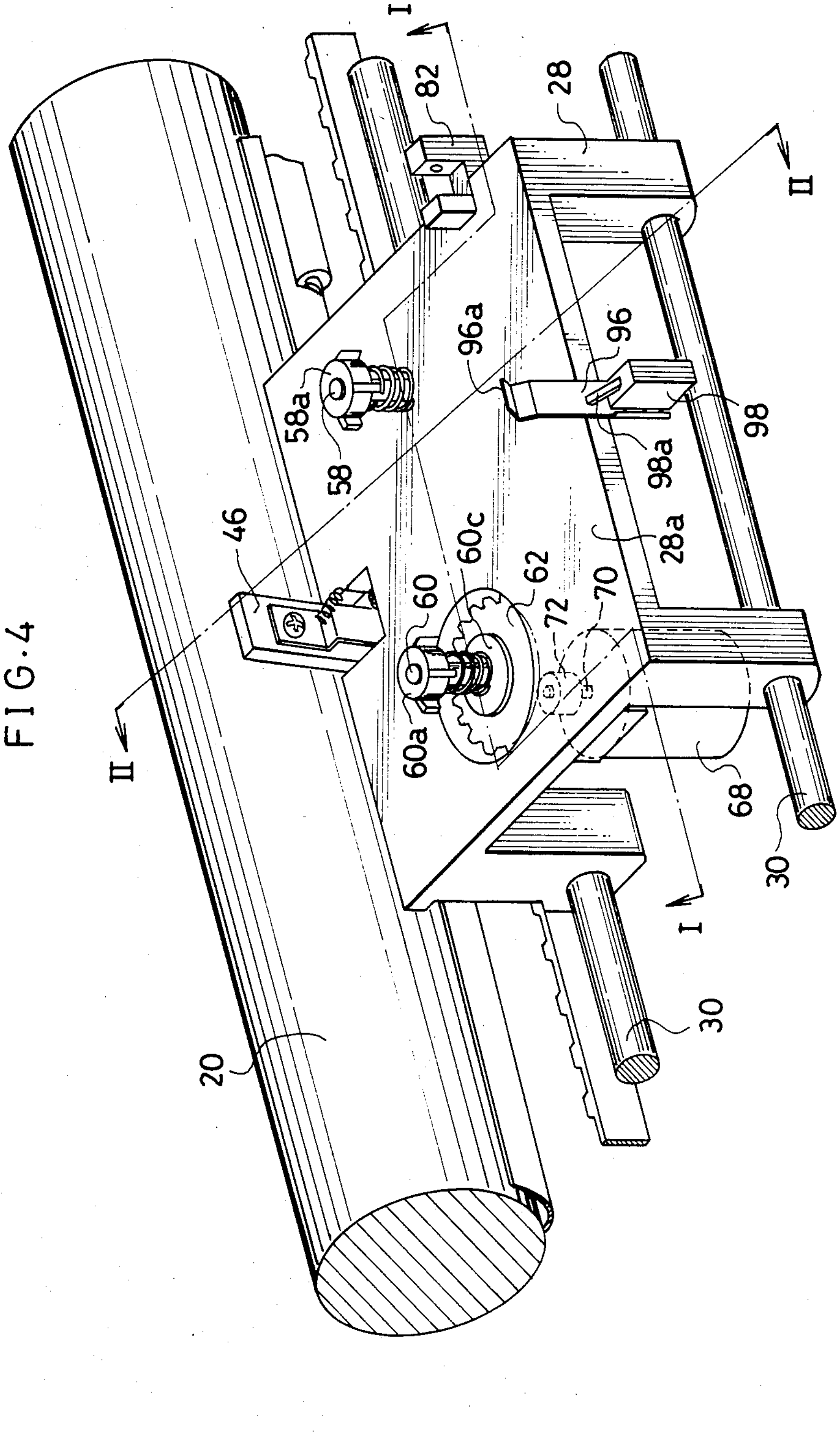
FIG. 4 is an enalrged perspective view of the principal mechanism shown in FIG. 2.
Figure 5:
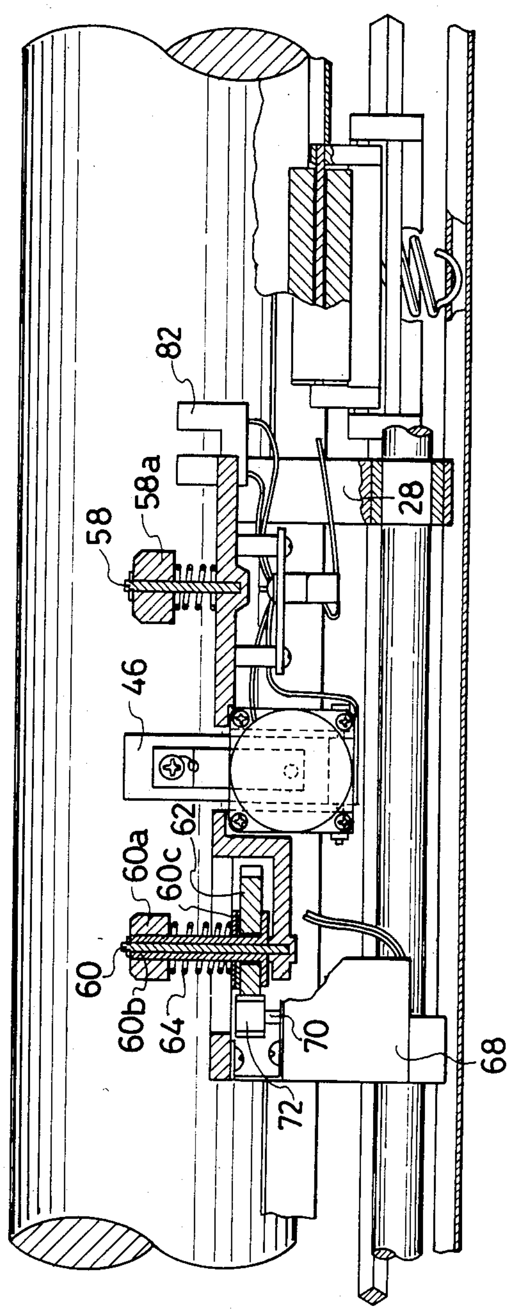
FIG. 5 is a cross-sectional view along the line I—I in FIG. 4.
Figure 6:
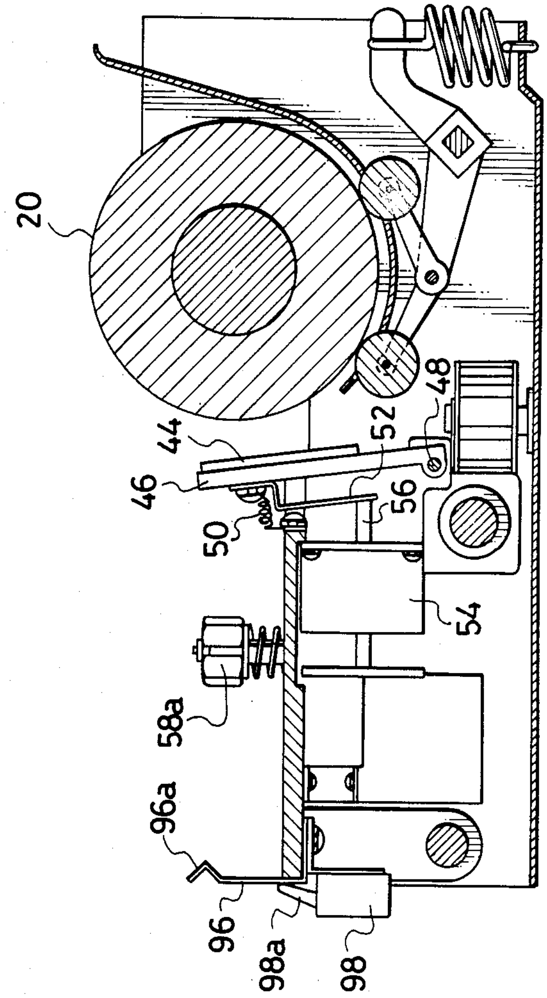
FIG. 6 is a cross-sectional view along the line II—II in FIG. 4.

Referring now to FIGS. 1, 2, 3, 4, 5 and 6, there is shown a thermal transfer color printer embodying the present invention with the reference number 10. This printer 10 is provided with a case 12 in which a chassis 14 is secured. A side plate 16*a* and a side plate 16*b* are fixed at opposite ends of the cassis 14, positioned parallel to one another. These side plates 16*a* and 16*b* are pierced by and support a shaft 18. A platen roller 20 is supported in a rotatable manner between the side plates 16*a* and 16*b* by the shaft 18. A print paper 22 is placed on the back surface of the platen roller 20 between the side plates 16*a* and 16*b* and a paper guide 24 is provided on the platen roller 20. A line feed motor 26 for rotating the platen roll 20, is provided on the shaft 18 at one side thereof. A carriage 28 is provided at the front surface of the platen roll 20 and is guided by a plurality of fixed guide rails 30 attached to the side plates 16*a* and 16*b* so that the carriage 28 is capable of moving parallel to the platen roll 20. A belt 42 is stretched parallel to the platen roll 20, between a drive pulley 38 being axially integral with a gear 36 and a supporting pulley 40. A motor 32 has a pinion 34 at its shaft which is engaged with the gear 36. The carriage 28 is moved back and forth by the motor 32 through this belt 42. A thermal head 44 is provided on the carriage 28 in opposition to the platen roll 20, in its turn, to the print paper. This thermal head 44 is mounted on a head support plate 46. The head support plate 46 is fixed in a freely rotatable manner at a shaft 48 which is secured to one section of the carriage 28. On the opposing surface of the head support plate 46 on which the head 44 is not attached, there is secured a retaining spring 50 formed from a coiled spring, for the purpose of maintaining the head 44 and the platen roll 20 in the standby position separated by a distance when printing is not being carried out; and, a pressure-welded spring 52 formed from a plate spring, is secured in order to maintain the force of the desired printing pressure when printing is performed. Also, a solenoid 54 is secured on the carriage 28 on the side of the surface of the head support plate 46 to which the head 44 is not attached. The other end of the pressure-welded spring 52 is in contact with one end of a rod 56 which advances or retreats according to the OFF-ON action of the solenoid 54. The head 42 on the head support plate 46 is usually in the stand-by position, separated from the platen roll 20. When power is applied to the solenoid 54, the rod 56 pushes the pressure-welded spring 52, and the produced force overcomes the force of the retaining spring 50, causing the head support plate 46 to rotate on the shaft 48 and contact with the platen roll 20. At this time, the other end of the pressure-welded spring 52 is pressed by the rod 56 and its position is regulated, causing the head 44 to be pressed against the platen roll 20. That is, the head is able to move back and forth between the print position in which it contacts the print paper, and the stand-by position in which it is separated from the print paper. Accordingly, the head 44 is normally maintained in the stand-by position by the spring 50, but, when a printing operation is carried out, it is moved to the print position by the solenoid 54 in response to the print code. A feed shaft 58 and a winding shaft 60, which are separated by a prescribed distance, protrude in a rotatable manner from the upper surface 28*a* of the carriage 28, on which is mounted a cassette case, which is shown in FIG. 3 and will be described later. A cam 58*a* is integrally attached to the upper end of the feed shaft 58.

In the same way, a cam 60*a* is attached to a pipe 60*b* on the upper end of the winding shaft 60. A gear 62 is pressed to a flange of the pipe 60*b* through a spring 64 and a pressure plate 60*c*. This gear 62 meshes with a pinion 72 which is fixed to a rotating shaft 70 of a winding motor 68 which is attached to the carriage 28. The rotation of the motor 68 is transmitted to the cam 60*a* utilizing the frictional force developed between the pipe 60*b* and the pressure plate 60*c* and the gear 62.

The winding of the ink ribbon is performed by a winding reel 74 which meshes with the cam 60*a*. The in ribbon is wound onto the reel to a length equivalent to the ink ribbon winding length of one step of the motor. At the same time, during the act of transfer, the ink ribbon is pressed against the print paper by the head, and, along with the movement of the carriage, it is necessary that the portion of ink ribbon used be wound up.

Figure 7:
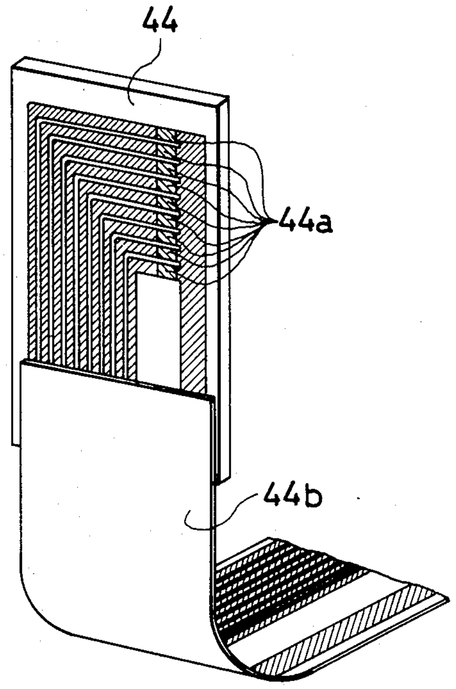
FIG. 7 is an enlarged explanatory view of the thermal head shown in FIG. 2.
Figure 8:
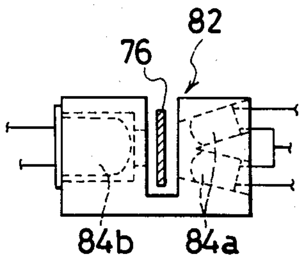
FIG. 8 is an enlarged explanatory view of the color sensor shown in FIG. 2.
Figure 9:
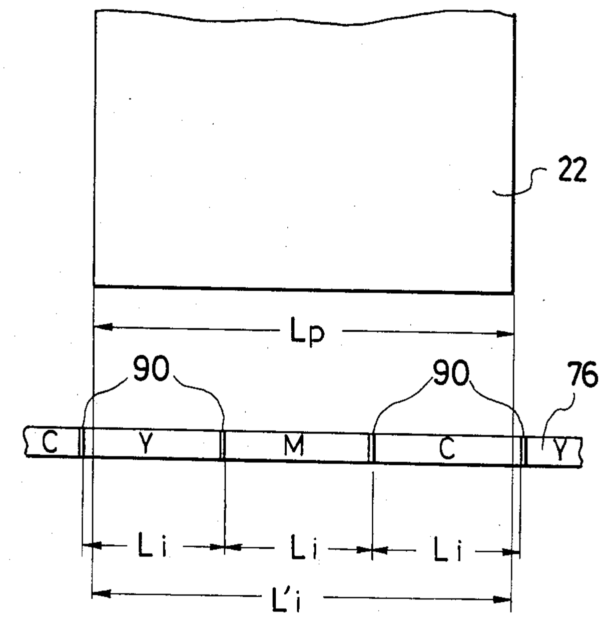
FIG. 9 is an explanatory drawing showing the dimensional relationship between the thermal ink ribbon and print paper in the color printer shown in FIG. 2.

However, in the structure outlined above, because the quantity of ink ribbon wound up for one step of the motor changes as a result of the change in the diameter of the reel, the number of winding steps of the motor in the winding is made constant, and change of the quantity of the ink ribbon wound up by means of the slip between the gear and the pipe 60*b*. As shown in FIG. 3, a cassette case 78 in which a thermal ink ribbon 76 is stored, is mounted on the carriage 28 in a freely removable manner. That is to say, the reels 80 and 74, which are used to feed the ribbon in the cassette case 78 are secured so that it is possible to rotate with an interval equivalent to the interval between the cam 58*a* and 60*a*. The thermal ink ribbon 76 runs between the reels 80 and 74, guided by a plurality of pulleys 81. The reels 80 and 74 are engaged with the cams 58*a* and 60*a* so as to position the part of the thermal ink ribbon 76 which is drawn out of the case exit 78*a* of the case 78 formed in the sidewalls of the cassette case 78, between the thermal head 44 and the print paper. The thermal head 44, as shown in FIG. 7, comprises a thermal head heating section 44*a* and a flexible PC plate 44*b*. The thermal head heating section 44*a* is formed by a plurality of heating elements grouped parallel to the feed direction of the print paper, and is heated selectively in response to a print data signal. The thermal ink ribbon 76 has a plurality of color materials which comes into contact with the print paper. For example, color materials of the three basic colors, yellow, magenta, and cyan, as shown in FIG. 9, are arranged in a prescribed pitch width in a striped pattern. In this case, the dimension Li of each color material portion (in FIG. 9, the yellow, magenta, and cyan color materials are marked Y, M and C respectively) is set at an amount slightly in excess of, for example, $\frac{1}{3}$ of the standard width dimension Lp of the print paper 22. A color sensor 82 is provided on the carriage 28 adjacent to the ribbon feed reel 80. The color sensor 82, as shown in FIG. 8, comprises a light emitting diode 84*a* and a photo transistor 84*b* which are positioned to enclose the thermal ink ribbon 76 between them. The color sensor 82 detects the type of color material on the thermal ink ribbon 76 which is positioned between the light emitting diode 84*a* and the photo transistor 84*b*, and outputs a detection signal corresponding to that type. In this case, the distance between the color sensor 82 and the thermal head 44 along the thermal ink ribbon 76 is positioned essentially at the same width dimension as the width Li of each color material section of the thermal ink ribbon 76 (that is, ⅓ of the standard width Lp of the print paper, with a small increment). The wall of the cassette case 78 is cut at a position corresponding to the thermal head. That is, the cassette case 78 has an ink ribbon exposure region 86 in that position.

Accordingly, when the carriage 28 is moved and the motor 68 is driven to wind up the ribbon, and while the thermal ink ribbon 76 is being wound up, the print action is being selectively executed. In that case, at the point where the color sensor 82 detects, for example, magenta color material (that is, at the point where the leading section of the magenta color material is opposite the color sensor 82), the leading section of the yellow color material is faced to the thermal head 44. Accordingly, the color of yellow is printed onto the print paper 22. Furthermore, in the case where a red color is printed by means of magenta color material, and in the case where a blue color is printed by means of cyan color material, the print action may be initiated from the time that the color sensor 82 detects the leading sections of the cyan color material and the yellow color material, respectively. In this way, in accordance with the present invention, when the color of the ink ribbon is detected, the leading position of the prescribed color is accurately positioned at the heating section of the thermal head, therefore the waste of inkribbon by the beginning-portion search, as outlined for the conventional example, is completely avoided. In addition, in the case where it is desired to obtain mixed colors, the platen roll 20 is not rotated and more than two types of color materials are laid one on top of the other. Because of this, it is possible to reduce the waste of the thermal ink ribbon 76, while at the same time, a mechanism to accurately adjust the feed amount of the thermal ink ribbon becomes unnecessary.

Figure 10:
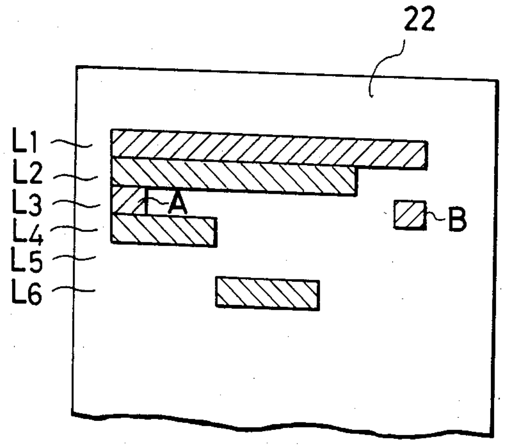
FIG. 10 is an explanatory drawing showing an example of actual print.
Figure 11:
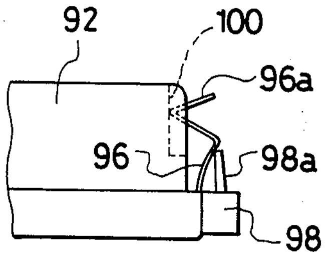
FIG. 11 is a partial side elevational view of a color cassette case installed on the carriage.

As shown in the print example of FIG. 10 (in FIG. 10, the printed sections are shown as a field of angled lines, and the respective symbols for each printed line are L1, L2 . . . , etc.), the print lines L3, L4 and L6, in which one part of the print only is carried out, are present in actual practice. When this type of print line L3, L4, L6 is printed with the previously mentioned thermal transfer color printer, on each printed line L3, L4, L6, regardless of the existence of large non-printed sections in each line of print, the amount of thermal ink ribbon used becomes relative to the width of dimension Li', and effective use of the thermal ink ribbon cannot be obtained.

As opposed to this, in this embodiment according to the present invention, the width of each color material section of the thermal ink ribbon 76 is set at about ⅓ of that of the conventional ribbon. At the same time, when using the configuration by which the thermal head 44 can move selectively to the print position and to the stand-by position, only about ⅓ of the amount of thermal ink ribbon is used for printing the sections A and B as comparing with that under conventional conditions. In addition, when printing the print lines L4 and L6, the amount of the thermal ink ribbon 76 used can be about ⅓ that of conventional usage. Furthermore, when print lines L1 and L2, it is acceptable to use three of the color material sections of the thermal ink ribbon 76. In this case, the amount of ink ribbon used is about the same as conventional usage. Furthermore, in this embodiment according to the present invention, as outlined above, because the width dimension of the color material sections of the thermal ink ribbon 76 is set at about ⅓ of the conventional width, for example, in print lines L4 and L6, when three color printing is carried out, the winding time for the color material sections of the thermal ink ribbon 76 can be shortened in view of the shortening of the time for printing.

Referring to FIG. 9, the thermal inkribbon 76 of this embodiment, in order to further accurately confirm the color material which is adjacent of the boundary section of each color material, has a minute transparent strip 90 formed at the boundary section of each color material. Accordingly, when the thermal ink ribbon 76 is fabricated, the color material which is adjacent to the boundary section of each color material is not applied in layers. For this reason, the color sensor 82 does not erroneously detect another color material in the boundary sections, and it becomes possible to upgrade the reliability of the position detection, while at the same time, the waste of the thermal inkribbon 76 from erroneous detection can be eliminated.

In addition, because the boundary sections of the color materials can be accurately detected by means of the strip 90, for example, even if the concentration of the cyan color material becomes light during operation, from the effect of another section, and its light permeability characteristic becomes close to that of the magenta color material, in the interval while the detection of the boundary section is being carried out, the magenta color material detection output can be judged as an erroneous action. From this aspect, the position detection of the color materials can be made more accurately.

Referring to FIGS. 2, 4, 5, 11 and 12, the apparatus for discriminating between the color ribbon cassette case 92 and the single color cassette 94 will be explained. Namely, a engaging member 96 fabricated from plate spring is installed in a projecting manner at the center section of the rear edge section of the carriage 28, and on its tip is formed a engaging projecting section 96*a* in the form of an angled letter L. A detection switch 98 is mounted on the back edge section of the carriage 28, and an actuating element 98*a* of the detection switch 98 touches the back side of the engaging member 96. The detection switch 98 is generally in the non-operating status, but when the actuating element 98*a* is pressed by the engaging member 96, the detection switch 98 is activated. Furthermore, the detection switch 98 is electrically connected to a control circuit which will be later explained. The thermal ink ribbon 76, on which is applied at a prescribed spacing, yellow, magenta, and cyan ink, in that order (respectively shown as Y, M and C in FIG. 9), is stored in the interior of the color cassette case 92. In the middle of the back edge section of the color cassette case 92 is formed a concave engaging section 100. A single color cassette case 94 is the same shape and the same dimensions as the color cassette case 92, and it contains the thermal ink ribbon 76 to which is applied a single color ink, for example, black. On the center of the back edge section of the single color cassette case 94 is formed a non-operating concave engaging section 102 which is deeper than the concave engaging section 100 of the color cassette case 92.

Accordingly, when the color cassette case 92 is installed on the carriage 28, the convex engaging section 96*a* of the engaging member 96 is engaged with the concave engaging section 100 of the color cassette 92. The engaging member 96 undergoes elastic deformation on its back side, and presses the actuating element 98*a* of the detection switch 98, thus activating the detection switch 98.

Figure 12:
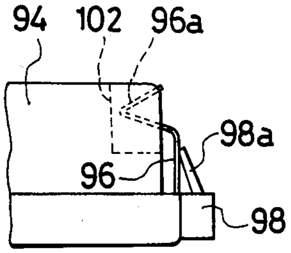
FIG. 12 is a partial side elevational view of a single color cassette case installed on the carriage.

At the same time, when the single color cassette case 94 is installed in the carriage 28, the convex engaging section or V-shaped portion 96*a* of the engaging member 96 is stopped in contact with the engaging concave section 102 of the single color cassette case 94. In this case, the engaging concave section 102 is deeper than the concave engaging section 100 so that, as shown in FIG. 12, the engaging member 96 does not undergo elastic deformation on its back side, and does not press the actuating element 98*a* of the detection switch 98, so that the detection switch 98 remains unactivated.

Next, the control circuit which controls the print action of this embodiment of the thermal transfer color printer in accordance with the present invention will be explained, with reference to FIG. 13.

Figure 13:
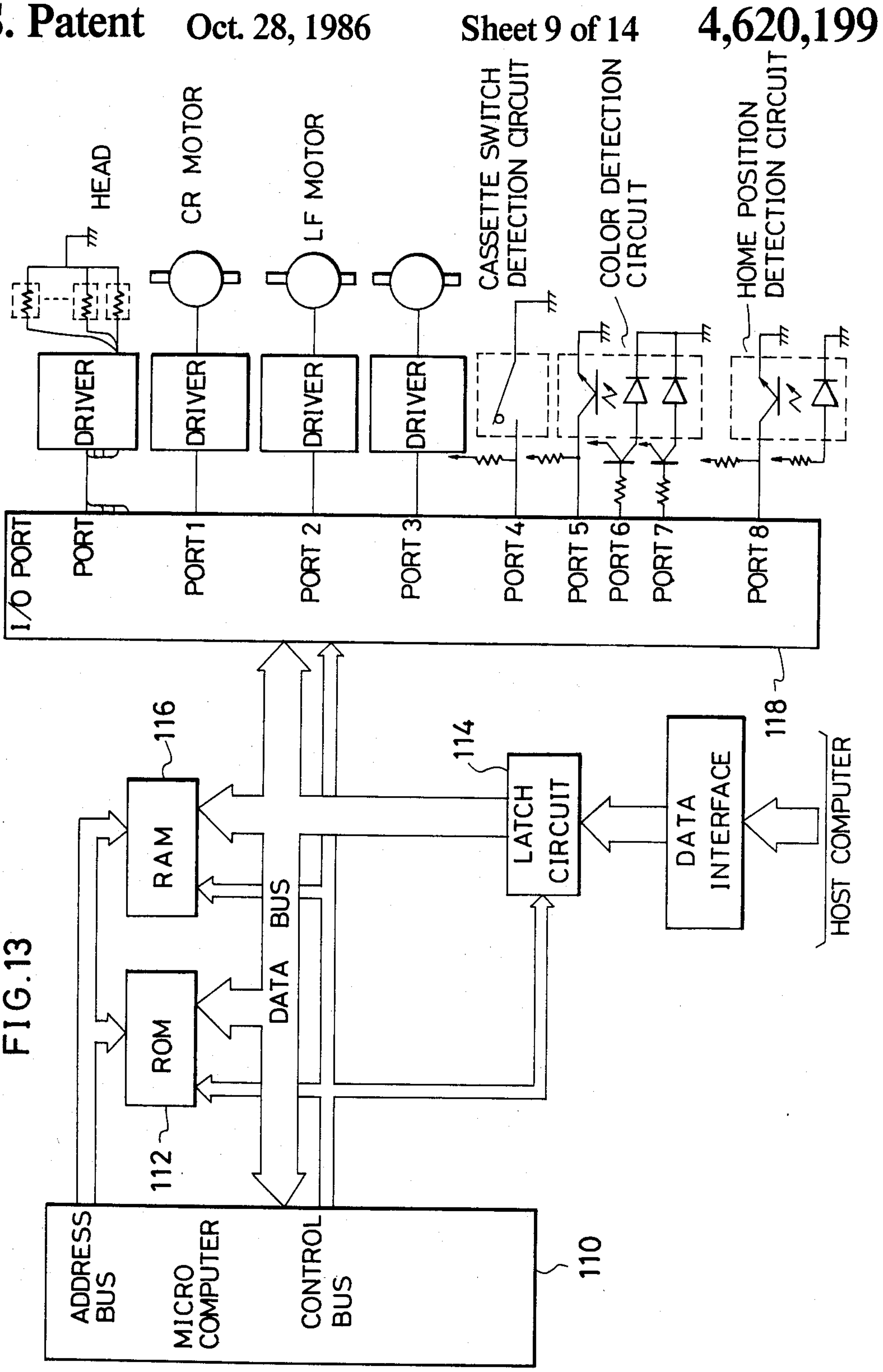
FIG. 13 is a block digram showing the control section of the thermal transfer color printer shown in FIG. 2.
Figure 14A:
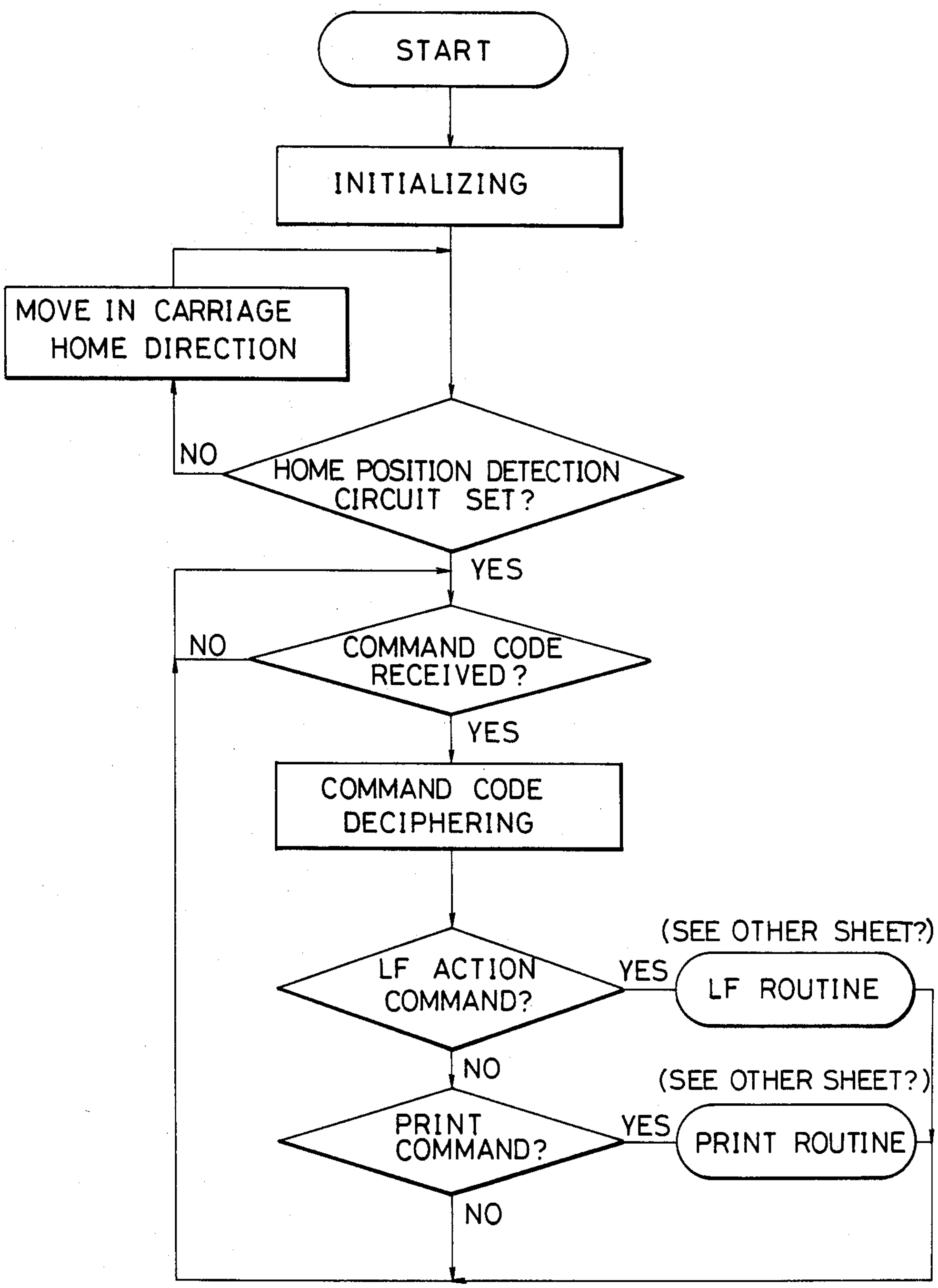
FIG. 14 A–E are flow charts showing the control process of an embodiment of the thermal transfer color printer in accordance with the present invention.
Figure 14B:
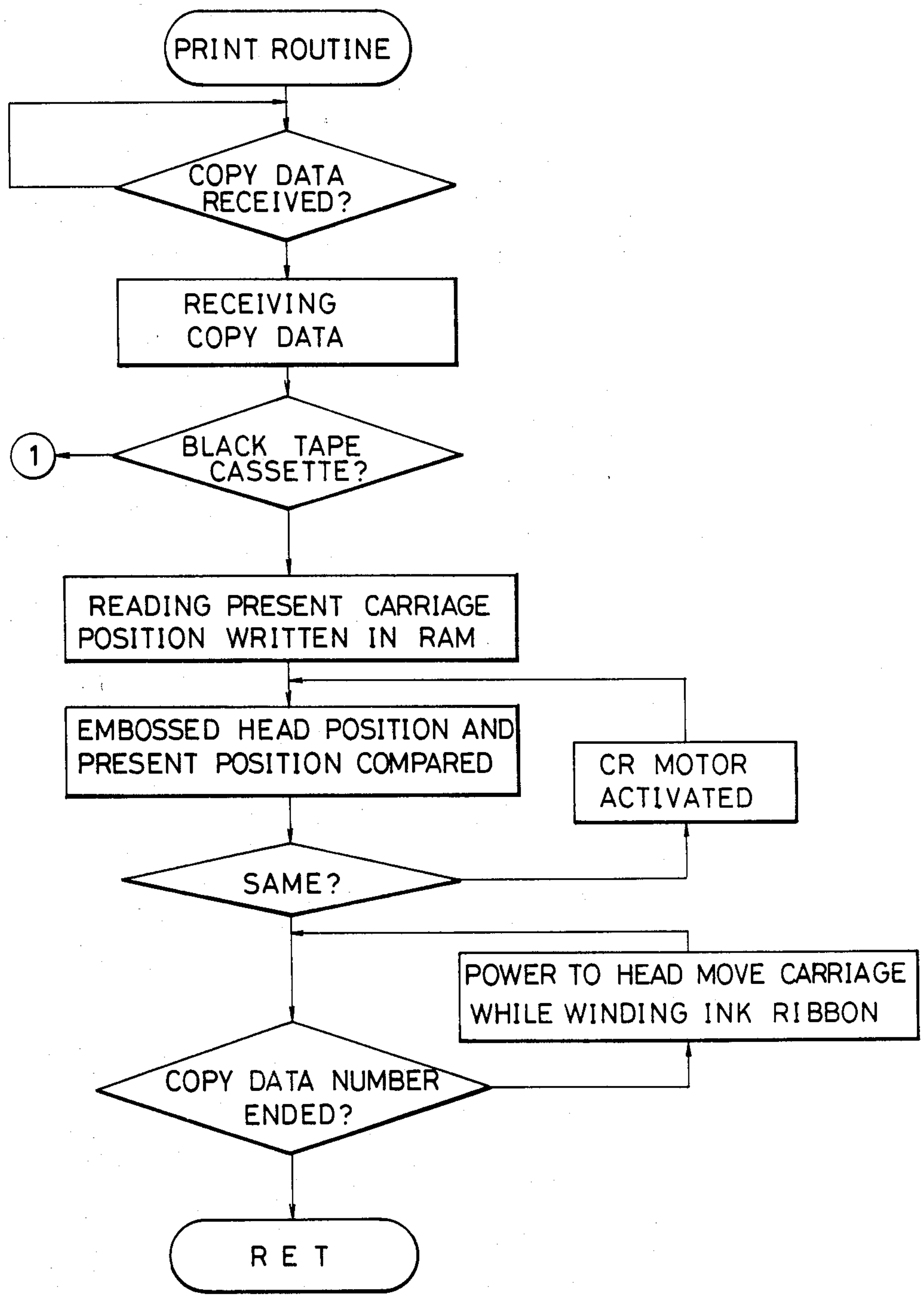
Figure 14C:
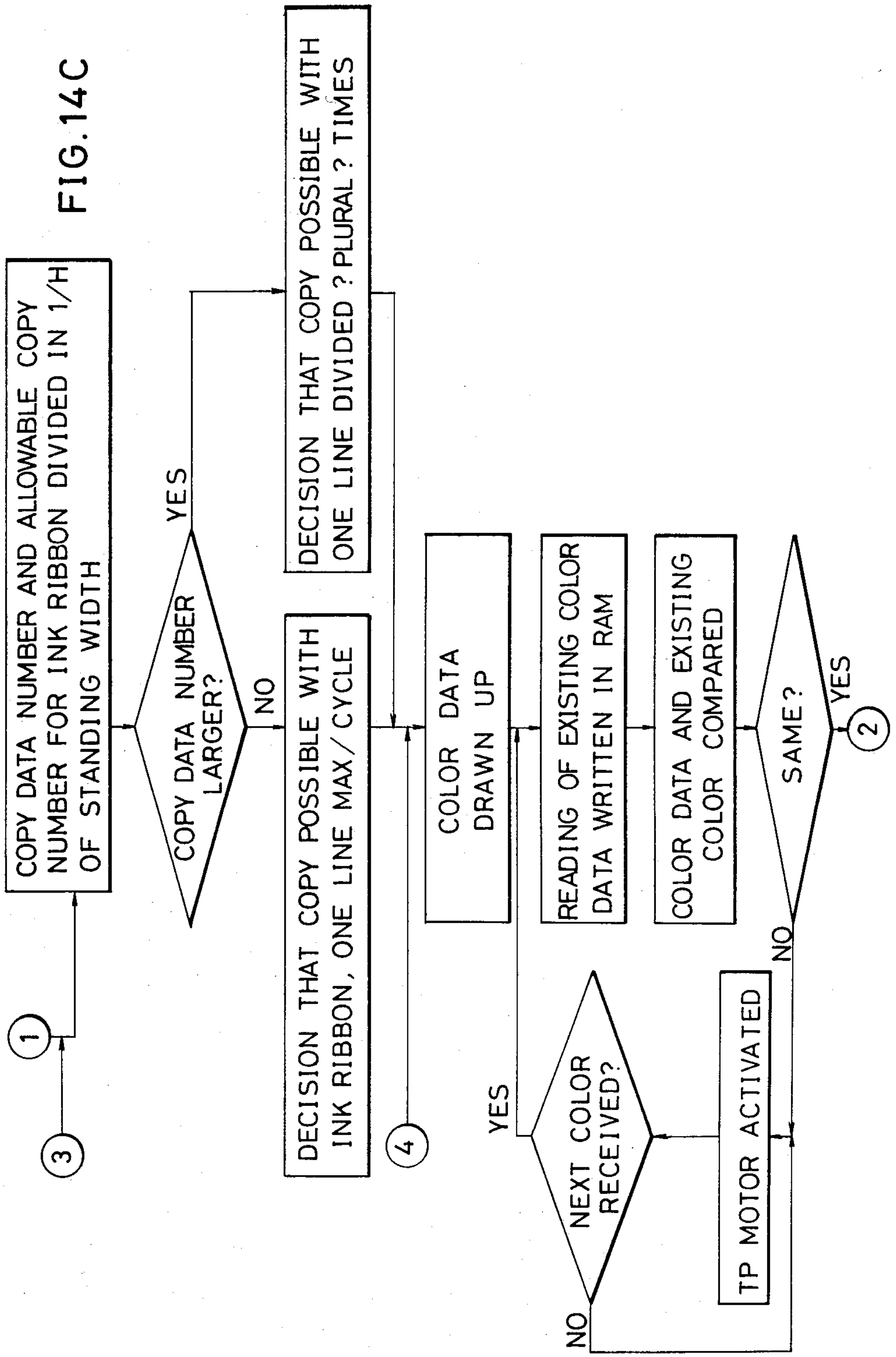
Figure 14D:
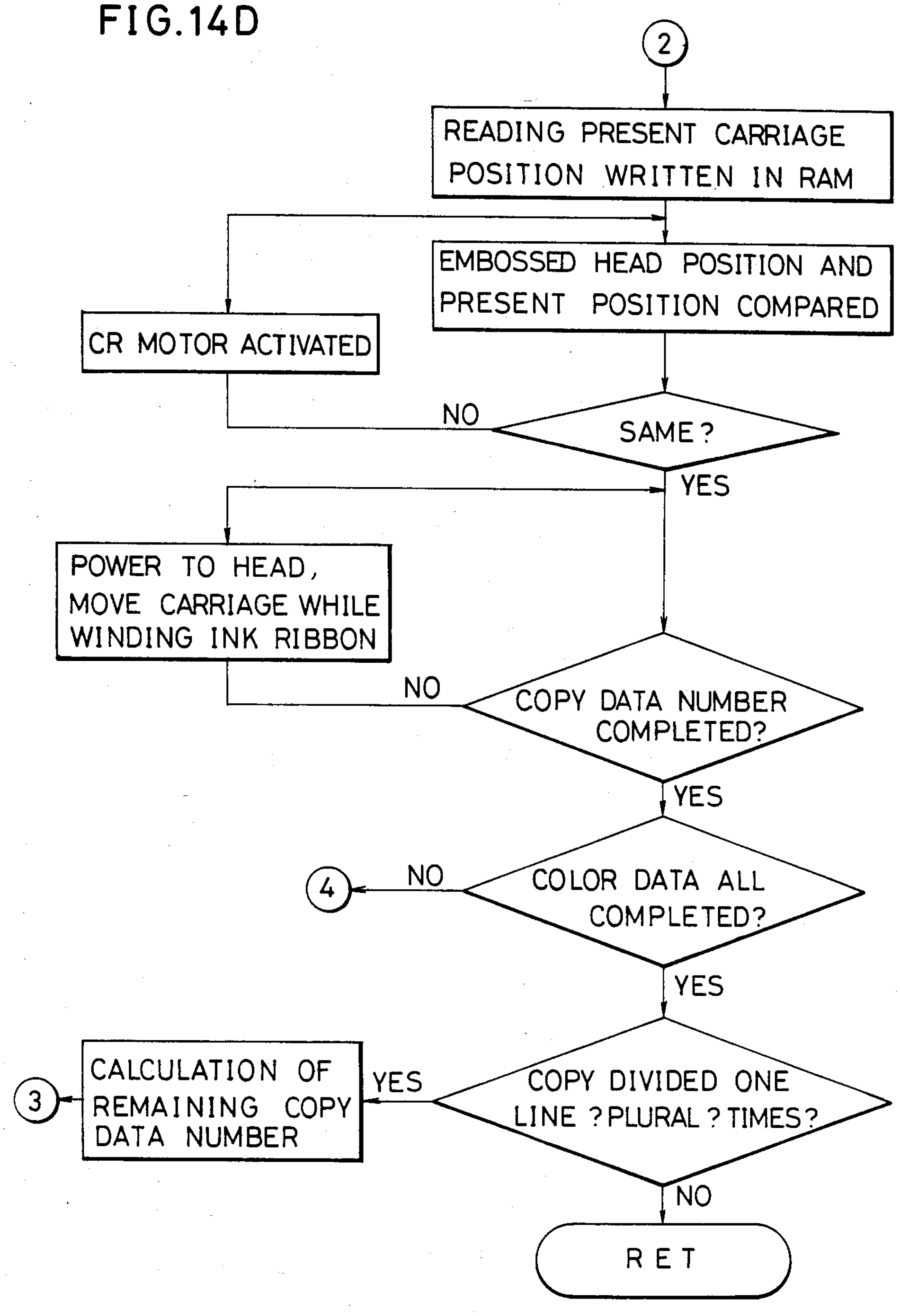
Figure 14E:
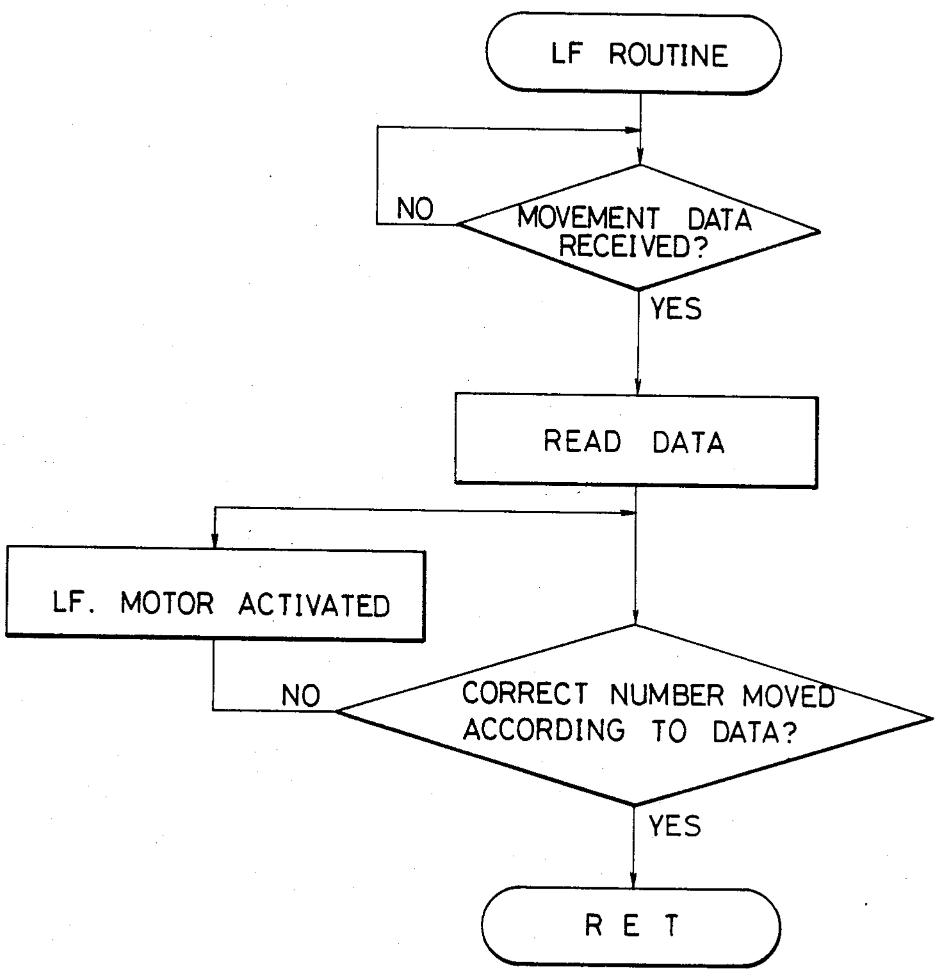

As shown in FIG. 13, this control circuit comprises a microcomputer 110, a ROM 112 in which is written a control program and data for the print pattern, a latch circuit 114 through which data from a host computer (not shown in the diagram) is inputted, a RAM 116 in which is written each type of control data used during printing, and an I/O port 118 through which detection signals from the cassette detection switch 98, from the color sensor 82, and from a home position detection circuit (not shown) is inputted, to the microcomputer 110, and also through which is outputted, from the microcomputer 110, print codes and control codes to the thermal head 44, to the carriage feed motor 32, to the line feed motor 26, and to the tape feed motor 68.

Next, with reference to the control charts shown in FIGS. 14 A to E, the control process carried out by the control circuit will be explained.

When the main power is applied to the printer, an data from the host computer. The program which is stored in the program ROM 112 is transmitted to an address bus and an address is specified, the program instructions are interpreted in order. At first, a check is made to see if the carriage is at the home position. By means of the control bus signals which are passing between the microcomputer 110 and the I/O port 118, through the data bus, a signal from a Port 8 is inputted to the microcomputer 110. The content of the signal passing through the data bus is interpreted in the microcomputer 110. When the carriage is at the home position, no action is taken, and when the carriage is not at the home position, data is outputted from the microcomputer 110 to the I/O port 118 by means of a control bus, and the data passes through the data bus and is outputted through a Port 1, and through a driver, then, the carriage feed motor 24 is caused to rotate. When the carriage 20 moves to the home position, data is transmitted from the host computer. When the data from the host computer is inputted, the microcomputer 110 checks a strobe signal which is not shown in the drawings, and confirms the data input. The data which is inputted to the latch circuit 114 passes from the latch circuit 114 through the data bus by means of a control bus signal and is outputted. From that data, the microcomputer 110, reads out the print pattern housed in the character generator which is written into one part of the ROM 112. In accordance with that print data, the microcomputer 110 sets the print pattern into the RAM 116, and at the same time outputs the data through the I/O port 118. The signal is then outputted to PORTs 1 and 3 connected to the carriage feed motor 32 and the ribbon winding motor 68. Based on the print pattern set into the RAM 116, a signal is also outputted synchronously to a PORT within the I/O port 118 which connected with the head. From that signal, voltage is applied to a head heat generating resistor, each motor phase is energized, and the printing action is carried out. The transmission of the print data is repeated in the above manner.

Next, the control of the printer after the transmission of the data from the host computer will be explained. The printer control commands are mainly divided into two types, namely, print control and LF line feed control. The input command code is decoded, and the program which is stored in the ROM 112 is executed according to the content of that command code. When the LF control code is inputted, the address of the LF control program stored in the ROM 112 is specified and executed. Whereupon, based on the line feed data inputted after the command code, the line feed motor is activated and caused to rotate.

Next, when the print code is inputted, the print program address, which is written in the ROM 112, is specified, and executed in the same way as for LF. First, the detection is made by means of the cassette switch detection circuit which is connected to the PORT 4 of the I/O port 118, to determine which one of either the color ribbon cassette or the black ribbon cassette is loaded. By means of this detection circuit, in the case of the color print data, because the microcomputer recognizes the black ribbon cassette when the black ribbon cassette is loaded, a beginning-portion search is not carried. Also in the case of the use of the color ink ribbon, which is divided into the essential print standard width of 1/h, this fraction being an integer fraction in which h=1, 2, 3, etc. the trouble of making a calculation for the number of print lines, etc., do not happen, and that data is able to cause the printing of one line of black without error. Also, in the case where thermal paper is used, the ink ribbon cassette is not used, but in this case also, the cassette switch, in the same way as for the black single color, is in the inactive status. Therefore the command from the host computer is in the color print mode, the printer determines the black color, and the printing can be performed without error. In addition, it is Also, from the color sensor data, the fact that a thermal paper use mode is easy to determine, makes it possible not to run the ink ribbon winding motor. In the case where the color cassette is detected, the ink ribbon width, which was previously inputted to the computer (divided into the standard width 1/h) is compared with the print data, and for any number of lines of printing, the calculation is made to see if one line is completed. By the fact that the ink ribbon is divided into 1/h, it is possible to reduce the waste of the ink ribbon.

After calculation of the number of line of print, print data is drawn up for each print color and the required beginning search of the portion ink ribbon is carried out. The color materials beginning search operation is peformed only at the time when the print data differentiated by the color material is read. Namely, based on the output of the color sensor 82, among the color materials corresponding to the reading of the print data differentiated by the color material, the leading section of the color material which is closest to the thermal head 44 is fed on the thermal head 44. By this means, after the completion of the printing of one line and after the power is turned on, the initial search the beginning-portion is not executed, therefore the waste of the thermal ink ribbon can be held down. In the search of the ink ribbon the beginning-portion of the necessary ink ribbon color material comes to the position on the thermal head 44, and according to the output signal of the color detection circuit, the ribbon feed motor 68 is activated. After the search of the ink ribbon, the carriage feed motor 32 is activated to move the carriage as far as the position of head portion of the line.

Preparations for printing are carried out as outlined above, and next the thermal head 44 is pressed against the platen roll 20 and voltage is applied to the heating resistor of the thermal head 44. While the ribbon feed motor 68 driven to wind the ribbon, the carriage 28 is moved, and one color portion of print, corresponding to the print data, is completed. If the print data is a single color command, the operation is completed at this process. However, if the command calls for two-color or three-color layers, the above action is repeated for the necessary number of colors, completing one line of print. However, because, the ink ribbon color material for one color is divided into 1/h of the standard width, in the case where the printing data for one line exceeds the allowable width of ink ribbon, the next printing data is taken, and the printing action is repeated until the processing of each line of print data has been completed. In the above manner, the printing of each line can be carried out. In this embodiment according to the present invention after the color data is prepared and the color head positioning completed, the carriage 28 is moved as far as the embossed leading position, but the two actions are not performed in sequence, but simultaneously, and it is a matter of course that the operation time is therefore reduced.

Various modifications will become possible for those skilled in the art after receiving the teachings of the present desclosure without departing from the scope thereof.

What is claimed is:

1. A thermal transfer color printer having a carriage moving mechanism, a thermal head moving mechanism, and a ribbon feeding mechanism, said printer comprising:

(a) a thermal ink ribbon having different color materials each having a predetermined equal section so as to thermally transfer the colors from the thermal ink ribbon to a print paper;

(b) a thermal head for transferring the color materials to the print paper;

(c) a color sensor for detecting each color material disposed on each section of said ink ribbon;

(d) a carriage carrying said thermal head, a cassette and said color sensor and movable relative to the print paper in accordance with the movement of the carriage moving mechanism, said cassette removably mounted on said carriage and storing the thermal ink ribbon; and (e) a control unit including a microprocessor having a CPU, a ROM, and a RAM, said control unit controlling the carriage moving mechanism, the thermal head moving mechanism, and the ribbon feeding mechanism in accordance with detected signals from the color sensor and print information received by said printer, said color sensor being arranged such that the distance from said color sensor to said thermal head along said thermal ink ribbon is substantially equal to the length of said each predetermined section of the ink ribbon in the direction of feed, the combined length of two or more different said predetermined equal sections for the color materials of said thermal ink ribbon being set at the standard print width of the print paper.

2. A thermal transfer color printer as claimed in claim 1, wherein said thermal ink ribbon has an additional slight excess of length.

3. A thermal transfer color printer as claimed in claim 1, wherein said cassette includes a section in which said ink ribbon is exposed corresponding to the position of said color sensor.

4. A thermal color printer as claimed in claim 1, wherein a transparent strip is provided at each of the boundary portions of said color materials of said ink ribbon stored in said cassette for multi-colors so as to prevent a misdetection by said color sensor among colors of the ink ribbon.

5. A thermal transfer color printer as claimed in claim 1, wherein said control unit is constructed to control said ribbon feed mechanism according to the detection results of said color sensor and said print information so that the beginning portion of the color material of the thermal ink ribbon corresponding to the print information is positioned at said thermal head, said control means being constructed to control said ribbon feed mechanism only when said print information is read.

6. A thermal transfer color printer as claimed in claim 1, wherein the leading portion of each of said color materials of said ink ribbon which is closest to the thermal head is positioned at the thermal head among the color materials corresponding to the reading of the print information in accordance with the output of the color sensor, when said control unit reads particular print information identified with different colors.

7. A thermal transfer color printer having a carriage moving mechanism, a thermal head moving mechanism, and a ribbon feeding mechanism, said printer comprising:

(a) a thermal ink ribbon having different color materials each having a predetermined equal section;

(b) a thermal head for transferring the color materials to a print paper;

(c) a color sensor for detecting each color material disposed on each section of said ink ribbon;

(d) a carriage carrying said thermal head, a cassette and said color sensor and movable relative to the print paper in accordance with the movement of the carriage moving mechanism, said cassette removably mounted on said carriage and storing the thermal ink ribbon of multi-colors; and (e) a control unit including a microprocessor having a CPU, a ROM, and a RAM and for controlling the carriage moving mechanism, the thermal head moving mechanism, and the ribbon feeding mechanism in accordance with detected signals from the color sensor and print information received by said printer, said color sensor being arranged such that the distance from said color sensor to said thermal head along said thermal ink ribbon is substantially equal to the length of said each predetermined section of the ink ribbon in the direction of feed, the combined length of two or more different said predetermined equal sections for the color materials of said thermal ink ribbon being set at the maximum distance which the thermal head can move.

8. A thermal transfer color printer for receiving and printing information on print paper, comprising:

(a) a carriage having a carriage moving mechanism, said carriage movable relative to the print paper in accordance with the movement of said carriage moving mechanism;

(b) means in said carriage for removably receiving a cassette containing a thermal ink ribbon, said ribbon having one or more transferable color materials and movable by means of a ribbon feeding mechanism, if said ribbon has two or more colors each of said color materials occupys a predetermined equal section of said ribbon;

(c) a thermal head positioned in said carriage for transferring said at least one color material to the print paper, said thermal head being movable relative to said carriage by means of a thermal head moving mechanism;

(d) a color sensor in said carriage for detecting different color materials in said ink ribbon, said color sensor having an output signal; and (e) a control unit for controlling said carriage moving mechanism, said thermal head moving mechanism, and said ribbon feeding mechanism, said control unit including a CPU, a ROM and a RAM and being responsive to said color sensor output signal and to print information received by said printer; and (f) means in said printer for determining if said cassette contains an ink ribbon having a single color or if said cassette contains an ink ribbon having said two or more colors, said color sensor being arranged such that the distance from said color sensor to said thermal head along said thermal ink ribbon is substantially equal to the length of said each predetermined section of the ink ribbon in the direction of feed, the combined length of two or more different said predetermined equal sections of said thermal ink ribbon being set at the maximum distance which the thermal head can move.

9. A thermal ink transfer printer as claimed in claim 8, wherein said determining means comprises a detection switch which includes an engaging member installed in a projecting manner on said carriage and having an engaging projection section formed on its tip, and a detection switch mounted on a back edge section of said carriage and having an actuating element touching a back side of said engaging member, said engaging projection engageable with a concave engaging section of said cassette, the depth of said concave engaging section being a function of the number of colors in said ink ribbon stored in said cassette.

10. A thermal ink transfer printer as claimed in claim 9, wherein said cassette storing said ink ribbon has a deeper said concave engaging section if said ribbon has said single color than if said ink ribbon has said more than one color.

* * * * *